(12) United States Patent
  Aoyama

(10) Patent No.: US 8,885,051 B2
(45) Date of Patent: Nov. 11, 2014

(54) CAMERA CALIBRATION METHOD AND CAMERA CALIBRATION APPARATUS

(75) Inventor: Chiaki Aoyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1025 days.

(21) Appl. No.: 12/951,517

(22) Filed: Nov. 22, 2010

(65) Prior Publication Data
US 2011/0134253 A1    Jun. 9, 2011

(30) Foreign Application Priority Data

Dec. 4, 2009    (JP) ................................ 2009-276821

(51) Int. Cl.
  *H04N 17/00*    (2006.01)
(52) U.S. Cl.
  CPC .................................. *H04N 17/002* (2013.01)
  USPC ........................................ 348/187; 348/180
(58) Field of Classification Search
  CPC .......... H04N 13/0246; H04N 13/0203; H04N 13/0242; H04N 5/2258; H04N 13/0425
  USPC ......... 348/187, 184, 175, 176, 180, 188, 251, 348/223.1
  IPC ....................................................... H04N 17/00
  See application file for complete search history.

(56) References Cited

U.S. PATENT DOCUMENTS

| 7,023,472 | B1 * | 4/2006 | Kang et al. ..................... 348/187 |
| 7,525,593 | B2 * | 4/2009 | Ichikawa et al. .............. 348/370 |
| 8,253,834 | B2 * | 8/2012 | Fujiyama et al. ............. 348/302 |

FOREIGN PATENT DOCUMENTS

| JP |   62-081512 |  4/1987 | |
| JP | 2004-048399 |  2/2004 | |
| JP | 2004-309318 | 11/2004 | |
| JP | 2004-048399 | * 12/2004 | ............. H04N 17/00 |

* cited by examiner

*Primary Examiner* — Trang U Tran
(74) *Attorney, Agent, or Firm* — Rankin, Hill & Clark LLP

(57) ABSTRACT

With the distance between a reference plane and a line light source (13) maintained at a first distance, the line light source (13) is translated in two different directions, and the position of the line light source (13) for each individual pixel where the pixel has been photographed from an incident ray radiated from the line light source (13) is stored (STEP 3, 4). With the distance between the reference plane and the line light source (13) maintained at a second distance different from the first distance, the line light source (13) is translated in two different directions, and the position of the line light source (13) for each individual pixel where the pixel has been photographed from an incident ray radiated from the line light source (13) is stored (STEP 6, 7). A straight line with the minimum distance to the positions of the four line light sources is deduced as the trajectory (S) of the incident ray to each pixel (STEP 8, 9).

10 Claims, 3 Drawing Sheets

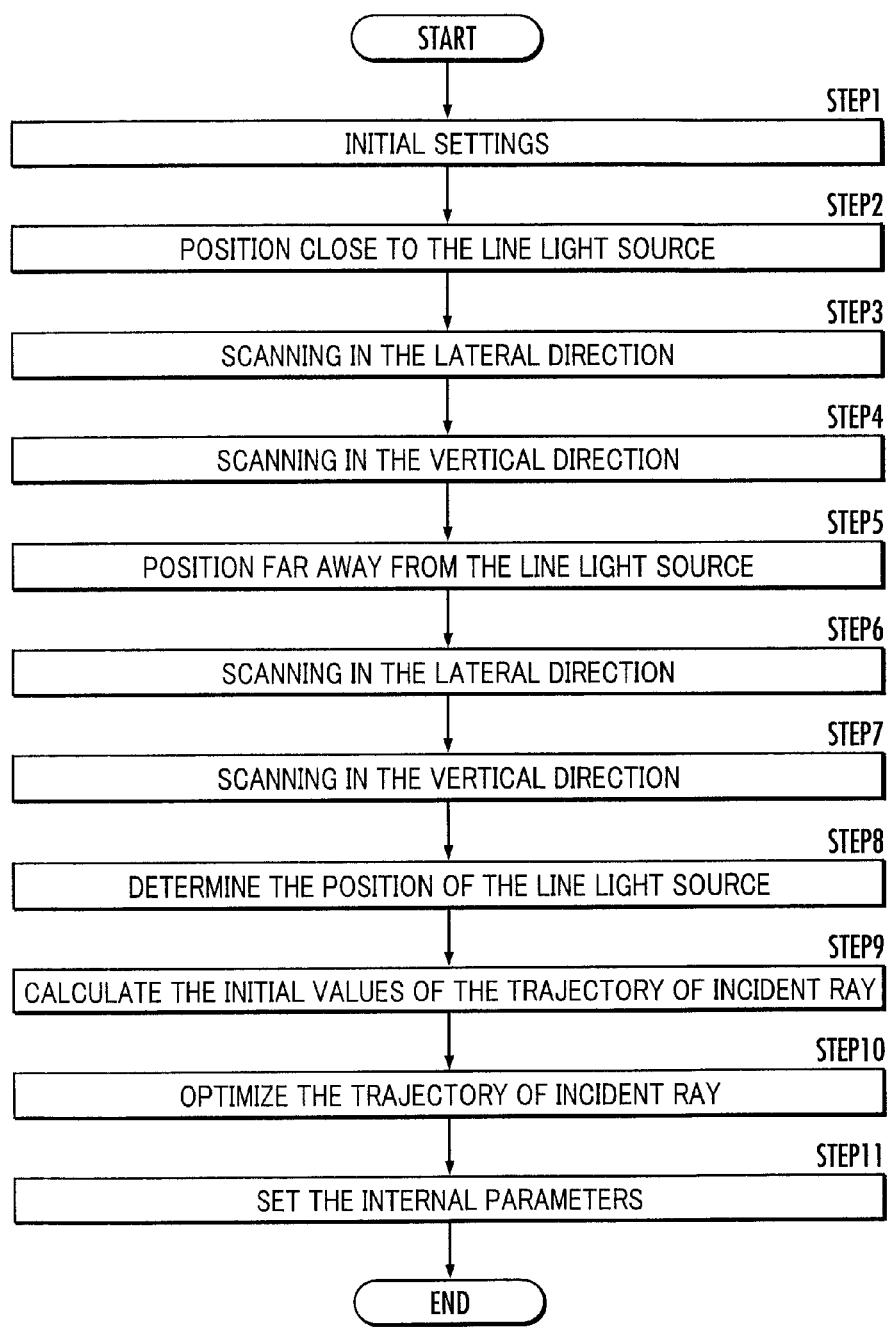

CAMERA CALIBRATION METHOD AND CAMERA CALIBRATION APPARATUS

BACKGROUND OF THE INVENTION

1. Field of the Invention

The present invention relates to a camera calibration method and a camera calibration apparatus adapted for the camera calibration method.

2. Description of the Related Art

In a stereoscopic vision system, the position of an object present in a real space is comprehensible on the basis of data of an image photographed by a camera. Therefore, in order to determine the position of an object present in a three dimensional real space by a stereoscopic vision system on the basis of an image photographed by a camera, it is necessary to calibrate the camera (camera calibration) so as to obtain an accurate relation between the image and directions thereof in the real space. However, due to the image distortions or the phenomenon such as incident rays do not intersect at one point or the like caused by a lens, it is necessary to perform the camera calibration with the non-pinhole property taken into consideration. Such camera calibration device, for example, has been disclosed in Japanese Patent Laid-open No. 2004-48399 (referred to as Patent Document 1 hereinafter).

The camera calibration device is provided with a rotation stage for varying the position of a point light source disposed in front of the camera on XYZ axes and a detection unit for detecting the position of the point light source on each axis. The rotation operation for rotating the rotation stage so that the image of the point light source falls on the center of a pixel is performed to move the point light source far away from and close to the camera for two times to deduce the trajectory of an incident ray from the point light source, thereby, to perform the camera calibration and set internal parameters of the camera.

However, according to the camera calibration method disclosed in Patent Document 1, it is necessary to deduce the trajectory of an incident ray for each individual pixel; therefore, a long time will be needed to calibrate the camera. Specifically, for an individual pixel, the operation for moving the image of the point light source to the center of the pixel will cost about 1 second; therefore, to calibrate a camera with 640×480 pixels will cost about 7 days. Since there are multiple cameras in the stereoscopic vision system, the calibration time will be as long as the time for calibrating one camera multiplied by the number of cameras in the stereoscopic vision system.

To perform the camera calibration with such a long time is practically impossible. For a common camera, linear interpolation is possible for a number of pixels; therefore, the camera calibration is performed every several pixels, and the linear interpolation is performed on the several pixels. Nevertheless, to calibrate one camera with 640×480 pixels for every 5 pixels each time will cost about 7 days. Also, the calibration accuracy will be decreased if the number of pixels is made greater; therefore, shortening the calibration time by making the number of pixels greater than that is practically impossible. Thereby, the camera calibration method which costs such a long time cannot cope with the mass production of cameras.

Moreover, according to the camera calibration method disclosed in Patent Document 1, the trajectory of the incident ray is deduced for each individual pixel by the usage of a convergence processing based on feedback loop; therefore, if the pixel corresponding to the direction of incident ray is of plural numbers, they may not converge. For example, when a camera has an extremely distorted shield or a plurality of lenses, for the same incident ray, the pixel corresponding to the same incident ray is of plural numbers.

SUMMARY OF THE INVENTION

The present invention has been accomplished in view of the aforementioned problems, and it is therefore an object of the present invention to provide a camera calibration method capable of performing camera calibration with the non-pinhole property taken into consideration at a short time and with a high accuracy.

It is also an object of the present invention to provide a camera calibration method capable of performing camera calibration with general versatility to cope with a common optical system including the case where plural pixels corresponding to the same incident ray are present.

It is further an object of the present invention to provide a camera calibration apparatus adapted for the camera calibration method.

To attain an object described above, the present invention provides a camera calibration method configured to determine internal parameters of a camera through deducing a trajectory of an incident ray to each pixel. The camera calibration method of the present invention comprises: a first line light source moving step of moving the line light source with respect to a reference position in a direction different from the longitudinal direction of the line light source, and storing a position of the line light source for each individual pixel where the incident ray from the line light source is photographed by each pixel; a second line light source moving step of moving the line light source with respect to the reference position in a direction different from both the longitudinal direction of the line light source and the direction of the first line light moving step, and storing a position of the line light source for each individual pixel where the incident ray from the line light source is photographed by each pixel; and a trajectory deducing step of deducing a straight line with the minimum distance to the positions of the line light source stored in the first line light source moving step and in the second light source moving step for each individual pixel, respectively, as the trajectory of the incident ray to each pixel.

The reference position is a predefined point, line, plane or the like, for example, it may be a predefined point, line, plane or the like on the camera or on a fixing member thereof. The line light source may be of a linear shape such as a straight line or a curved shape such as an arc, a circle or the like. Moving the line light source is not limited to move the line light source physically. For example, it may be a case where a light-emitting element is made to vary linearly with time on a display such as a flat panel display (FPD) or a case where a linear high luminance portion projected on a screen is made to vary with time.

According to the camera calibration method of the present invention, if the expansion of the base point of the incident ray is sufficiently small and already known, the trajectory of the incident ray for each pixel of the camera can be deduced by moving only twice the line light source with respect to the reference position in two directions different from at least the longitudinal direction of the line light source in the first and second line light source moving step. This is because that if the base point of the incident ray is specified, the trajectory of the incident ray can be deduced through the determination of two lines passing through the incident ray.

However, if the expansion of the base point of the incident ray is sufficiently small and is unknown, it is necessary to determine at least four lines passing through the incident ray so as to deduce the trajectory of the incident ray.

Thereby, it is preferred that the camera calibration method of the present invention further includes a third line light source moving step of moving the line light source with respect to the reference position in a direction different from the longitudinal direction of the line light source and with a distance to the reference position different from that in the first and second line light source moving steps, and storing a position of the line light source for each individual pixel where the incident ray from the line light source is photographed by each pixel; and a fourth line light source moving step of moving the line light source with respect to the reference position in a direction different from both the longitudinal direction of the line light source and the direction of the third line light moving step and with a distance to the reference position different from that in the first and second line light source moving steps, and storing a position of the line light source for each individual pixel where the incident ray from the line light source is photographed by each pixel; wherein a straight line with the minimum distance to the positions of the line light source stored in the line light source moving steps from the first line light source moving step to the fourth light source moving step for each individual pixel, respectively, is deduced as the trajectory of the incident ray to each pixel in the trajectory deducing step.

According thereto, the trajectory of the incident ray for each pixel of the camera can be deduced by moving only four times the line light source with respect to the reference position in two directions different from at least the longitudinal direction of the line light source.

Thereby, in comparison with the camera calibration method disclosed in Patent Document 1 for deducing the trajectory of the incident ray for each individual pixel, the calibration time of the camera is extremely shortened. Moreover, it is possible to calibrate plural numbers of cameras or plural numbers of color components simultaneously. Thereby, the calibration time of the camera can be further shortened.

Since four lines passed by the trajectory of the incident ray are specified for each individual pixel of the camera in the camera calibration method of the present invention, similar to the camera calibration method disclosed in Patent Document 1, the camera calibration method of the present invention can perform camera calibration with extremely high accuracy.

Since the trajectory of the incident ray is not deduced by the usage of convergence processing in the camera calibration method of the present invention, the camera calibration method of the present invention has general versatility to cope with a common optical system including the case where plural pixels corresponding to one incident ray are present.

It is preferred that in the camera calibration method of the present invention, the position of the line light source where the light acceptance intensity of the pixel is the maximum is stored as the position of the line light source where the incident ray from the line light source is photographed by each pixel in the line light source moving steps from the first line light source moving step to the fourth light source moving step. According thereto, it is easy to get the position of the line light source where the pixel is photographed.

It is preferred that in the camera calibration method of the present invention, the line light source is moved with respect to the reference position with the distance between the reference position and the line light source maintained at a first distance in the first and the second light source moving steps; and the line light source is moved with respect to the reference position with the distance between the reference position and the line light source maintained at a second distance different from the first distance in the third and the fourth light source moving steps.

In this regarding, when the reference position is a plane, it is preferred that a straight line passing through the intersection point of two line light sources stored in the first and the second line light source moving steps for each individual pixel and the intersection point of two line light sources stored in the third and the fourth line light source moving steps for each individual pixel is deduced as the trajectory of the incident ray to each pixel in the trajectory deducing step. Accordingly, similar to the camera calibration method disclosed in Patent Document 1, the camera calibration method of the present invention can perform camera calibration with extremely high accuracy.

It is preferred that in the camera calibration method of the present invention, a straight line passing through the mid-point between the closest point to position of the line light source stored in the first line light source moving step and the closest point to position of the line light source stored in the second line light source moving step and the mid-point between the closest point to position of the line light source stored in the third line light source moving step and the closest point to position of the line light source stored in the fourth line light source moving step is taken as an initial value in the trajectory deducing step, and the trajectory of the incident ray is searched in such a way that the sum of squares of the distances to the four positions of the line light source is minimum. Accordingly, the trajectory of the incident ray can be deduced quickly.

The present invention provides a camera calibration device configured to determine internal parameters of a camera through deducing a trajectory of an incident ray to each pixel. The camera calibration device of the present invention comprises: a moving member capable of moving a line light source with respect to a reference position with the distance between the line light source and the reference position maintained constant; a rotation member capable of rotating the line light source with respect to the reference position with the distance between the line light source and the reference position maintained constant; and a distance varying member capable of varying the distance between the line light source and the reference position.

It is preferred that the moving member can move the line light source parallel to the reference position, however, it is not limited thereto. It can be a member capable of any movement including rotating movement in case the position of the line light source with respect to the reference position is recognizable.

According to the camera calibration device of the present invention, the line light source can be moved with respect to the reference position by the moving member with the distance between the line light source and the reference position maintained constant. The line light source can be rotated with respect to the reference position by the rotation member with the distance between the line light source and the reference position maintained constant. The distance between the line light source and the reference position can be varied by the distance varying member. Thereby, the camera calibration device of the present invention enables the camera calibration method of the present invention to be performed easily.

It is preferred that in the camera calibration device of the present invention, the rotation member is capable of rotating the line light source 90 degrees with respect to the reference position. According thereto, the line light source is moved with respect to the reference position in two directions with a difference of 90 degrees in the first and second line light source moving steps, thus, the third line light source moving step becomes a step to obtain the intersection point of orthogonal line light sources. Thereby, the accuracy for obtaining the intersection point is improved, which enables the internal parameters of the camera to be determined with high accuracy.

It is preferred that in the camera calibration device of the present invention, the line light source is composed of a plurality of line light sources disposed parallel to each other in the longitudinal direction. According thereto, the distance for moving the line light source parallel to the reference position in the first and second line light source moving steps can be shortened, which enables the internal parameters of the camera to be determined in a shorter time.

BRIEF DESCRIPTION OF THE DRAWINGS

FIG. 3 is a flow chart illustrating the procedure of the camera calibration method according to an embodiment of the present invention.

DETAILED DESCRIPTION OF THE PREFERRED EMBODIMENTS

Figure 1:
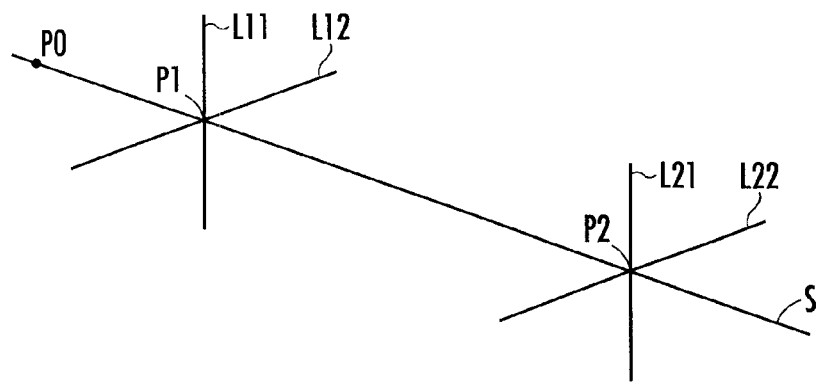
FIG. 1 is an explanatory view illustrating the principle of a camera calibration method of the present invention.

The principle of a camera calibration method of the present invention will be described with reference to FIG. 1.

Considering from the viewpoint of pixels, a camera photographs the luminance of an incident ray projected linearly from a specific direction on a specific base point P0 of the camera as an image. The incident ray to a lens of the camera is actually a light flux with expansion but not a straight line. However, if the lens is stopped down to the minimum, the light flux is considered to be a straight line called as principle ray. In an image measurement such as the three dimensional measurement or the like by stereoscopic vision, how the incident ray is passing through a lens is of no concern; therefore, it is sufficient to pay attention only on the incident ray before it is projected into the lens. Thus, the descriptions will be given by assuming that the incident light is the principle ray before entering the lens (hereinafter, referred to as the incident ray).

If two points passed by the incident ray in the three dimensional space can be specified, the trajectory of the incident ray can be specified as a straight line passing through the two points. In the abovementioned Patent Document 1, the trajectory of the incident ray is specified in such manner.

Also, if four mutually independent lines L1, L2, L3 and L4 passing through the incident ray can be specified, the trajectory S of the incident ray can be specified as a straight line passing through the 4 lines. Practically, errors such as determination errors, signal errors or the like are present, such straight line which passes through the 4 lines L1, L2, L3 and L4 does not exist generally; thereby, a straight line with the minimum distance to the 4 lines L1, L2, L3 and L4 is deduced as the trajectory S of the incident ray. The number of lines may be four or more. The more the number of lines is, the higher the accuracy for deducing the trajectory S of the incident ray will be.

Hereinafter, the camera calibration method of the present invention will be described with reference to FIG. 1.

Firstly, in a first line light source moving step, a line light source having roughly even luminance in the longitudinal direction thereof is moved with respect to a reference position (for example, a predefined point or surface of the camera) in a direction different from the longitudinal direction thereof. The position of the line light source where the incident ray from the line light source is photographed by each pixel is stored for each individual pixel. The image of the line light source passes through the pixels, when the acceptance intensity of a pixel becomes the maximum, the incident ray from the line light source is being projected on the center of the pixel.

However, due to sampling time, the position where the acceptance intensity is the maximum sometimes does not coincide with the real position of the maximum acceptance intensity. Deducing the maximum acceptance intensity from the intensities of plural sampled signals can improve the accuracy of obtaining the position of the maximum acceptance intensity. For example, the position of the line light source where the acceptance intensity of a specific pixel is the maximum is stored as a deduced line light source line L1.

Then, in a second line light source moving step, the line light source is moved with respect to the reference position in a direction different from both the longitudinal direction of the line light source and the direction in the first line light source moving step. The position of the line light source where the incident ray from the line light source is photographed by each pixel is stored for each individual pixel. For example, the position of the line light source where the acceptance intensity of the specific pixel is the maximum is stored as a deduced line light source line L2.

Thereafter, in a third line light source moving step, the line light source is moved with respect to the reference position in a direction different from the longitudinal direction of the line light source and with a distance to the reference position different from that in the first line light source moving step. The position of the line light source where the incident ray from the line light source is photographed by each pixel is stored for each individual pixel. For example, the position of the line light source where the acceptance intensity of the specific pixel is the maximum is stored as a deduced line light source line L3.

Subsequently, in a fourth line light source moving step, the line light source is moved with respect to the reference position in a direction different from both the longitudinal direction of the line light source and the direction in the third line light source moving step and with a distance to the reference position different from that in the first line light source moving step. The position of the line light source where the incident ray from the line light source is photographed by each pixel is stored for each individual pixel. For example, the position of the line light source where the acceptance intensity of the specific pixel is the maximum is stored as a deduced line light source line L4.

Thereafter, in a trajectory deducing step, a straight line with the minimum distance to the positions of the line light source stored in the line light source moving steps from the first to the fourth for each individual pixel, respectively, is deduced as the trajectory of the incident ray to the pixel. For example, the trajectory S of the incident ray to the specific pixel is deduced as a straight line with the minimum distance to the four deduced line light source lines L1, L2, L3 and L4.

If the expansion of the base point P0 of the incident ray is sufficiently small and already known, it is possible to determine the two deduced line light source lines L1 and L2 in the first and the second line light source moving steps, and thereafter, to deduce the trajectory S of the incident ray as a straight line with the minimum distance to the two deduced line light source lines L1 and L2 passing through the already known base point P0.

It is preferred that the line light source is moved with respect to the reference position in the line light source moving steps from the first to the fourth through translation, rotation or the like in such a way that the position of the line light source with respect to the reference position is comprehensible with ease. Note that if the position of the line light source is comprehensible, the mode of moving the line light source is not limited. Moreover, the four deduced line light source lines L1, L2, L3 and L4 stored for each individual pixel are mutually independent and at least three of the four deduced line light source lines are not in the same plane.

Figure 2:
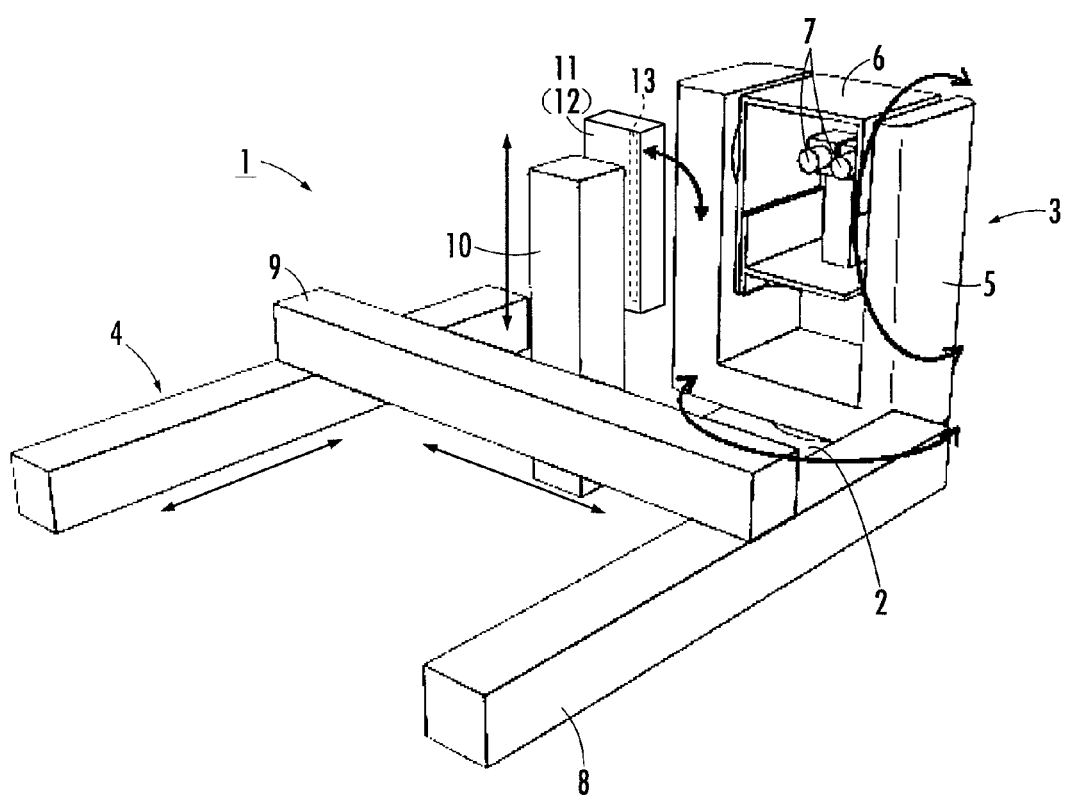
FIG. 2 is a perspective view schematically illustrating a camera calibration device according to an embodiment of the present invention.

Hereinafter, a camera calibration device 1 according to an embodiment of the present invention will be described with reference to FIG. 2.

The camera calibration device 1 is composed of a base stand 2, a rotation stage 3 capable of rotating with respect to the base stand 2 in two directions, and a three dimensional moving stage 4 capable of moving with respect to the base stand 2 in three dimensions.

The rotation stage 3 is provided with a pan-rotation platform 5 which is supported on the base stand 2 and capable of rotating around the vertical axis (Z axis) in the panning direction, and a tilt-rotation platform 6 which is supported on the pan-rotation platform 5 and capable of rotating around the horizontal axis (Y axis) in the tilting direction. A camera 7 is removably disposed at a predefined position on the tilt-rotation platform 6, facing to the front (in the positive direction of X axis). In the present embodiment, two cameras 7 are disposed on the tilt-rotation platform 6.

Although not shown in the drawings, the pan-rotation platform 5 and the tilt-rotation platform 6 are disposed with a rotation actuator such as a servo pulse motor or the like driven and controlled by a control unit, respectively. When the pan-rotation platform 5 and the tilt-rotation platform 6 are rotated by the rotation actuators, respectively, it makes the optical axis of the camera 7 swing laterally or vertically. Although not shown in the drawings, the rotation shaft of each rotation actuator is provided with a rotation angle sensor such as a rotary encoder or the like to detect an angle of the optical axis of the camera 7.

The camera 7, although not shown in detail in the drawings, has a photographing panel with plural pixels disposed in two dimensions. Each pixel is composed of a solid photographing element such as a charge-coupled device (CCD), a CMOS sensor or the like. Each pixel outputs an output signal according to the acceptance intensity of light. Moreover, the camera 7 is provided with a lens made of glass or resin, a shield, a covering sheet and the like in front of the photographing panel where necessary.

The three dimensional moving stage 4 is provided with an X axial rail 8, an Y axial rail 9, a Z axial rail 10, a vertical moving platform 11, and a roll-rotation platform 12. The X axial rail 8 is extended horizontally in the anteroposterior direction (X axial direction) with respect to the base stand 2. The Y axial rail 9 is extended in the lateral direction (Y axial direction), movable along the X axial rail 8 in the anteroposterior direction. The Z axial rail 10 is erected in the vertical direction (Z axial direction), movable along the Y axial rail 9 in the lateral direction. The vertical moving platform 11 is movable along the Z axial rail 10 in the vertical direction. The roll-rotation platform 12 is supported by the vertical moving platform 11 in such a way that it can rotate around the anteroposterior axis (X axis) in the roll direction. Moreover, the line light source 13 is fixed at a predefined position on the roll-rotation platform 12, facing backward (negative direction of X axis). In FIG. 2, the vertical moving platform 11 and the roll-rotation platform 12 are represented by an identical member.

Although not shown in the drawings, each of the Y axial rail 9, the Z axial rail 10 and the vertical moving platform 11 is disposed with a rotation actuator such as a servo pulse motor or the like driven and controlled by a control unit, and a driving force converter such as a rack-and-pinion mechanism, a ball screw mechanism or the like which converts the rotation driving force generated by the rotation actuator to linear motions. When the Y axial rail 9, the Z axial rail 10 and the vertical moving platform 11 are driven by the rotation actuators, respectively, the roll-rotation platform 12 is moved linearly in the anteroposterior direction, the lateral direction and the vertical direction.

Each of the X axial rail 8, the Y axial rail 9 and the Z axial rail 10 is provided with an electronic scaler (not shown) to detect the positional coordinates of the Y axial rail 9, the Z axial rail 10 and the vertical moving platform 11, respectively. In addition, the positional coordinates of the Y axial rail 9, the Z axial rail 10 and the vertical moving platform 11 can also be detected according to output signals from a rotation angle sensor (not shown) such as a rotary encoder or the like disposed in the rotation shaft of each rotation actuator.

The line light source 13 is a linear light-emitting member having a sufficiently narrow width with respect to the vision field of one pixel of the camera 7. The line light source 13 can be configured by disposing a light-emitting element such as a light-emitting semiconductor diode (LED), a semiconductor laser or the like, or a light-emitting body such as an incandescent light or the like in an opaque box formed with one slit of a narrow width. There is no limit to the type, configuration or the like of the light-emitting of the line light source 13. For example, the line light source 13 may be configured as a display device such as a liquid crystal display (LCD), a flat panel display (FPD) or the like which emits linear lights.

Hereinafter, a camera calibration method by the usage of the camera calibration device 1 according to an embodiment of the present invention will be described with reference to FIG. 2 and FIG. 3. The camera calibration device 1 hereinafter is controlled by the control unit described in the above.

Firstly, at STEP 1, the initial setting of the camera calibration device 1 is performed. Specifically, the camera 7 is mounted at a predefined position of the camera calibration device 1, meanwhile the pan-rotation platform 5 and the tilt-rotation platform 6 of the rotation stage 3 and the Z axial rail 10 and the vertical moving platform 11 of the three dimensional moving stage 4 are moved to predefined initial positions, respectively.

At STEP 2, the Y axial rail 9 is moved to an appropriate position close to the camera 7.

At STEP 3, the scanning of the line light source 13 in the lateral direction is performed. Specifically, the roll-rotation platform 12 of the three dimensional moving stage 4 is rotated to make the longitudinal direction of the line light source 13 vertical. Thereafter, while the line light source 13 is emitting lights, the Z axial rail 10 is translated in the lateral direction. Thus, the line light source 13 intersects the vision fields of all the photographing pixels of the camera 7. The information denoting a correspondence relationship between output signals of each pixel and the position of the line light source 13 in the lateral direction, associated with time, is stored in a memory (not shown). When the Z axial rail 10 is moved in the lateral direction, the distance between a vertical plane (for example, a plane formed from a predefined vertical plane of the camera 7 or the pan-rotation platform 5 which is still at the predefined position) served as the reference position and the line light source 13 is maintained at a predefined first distance.

At STEP 4, the scanning of the line light source 13 in the vertical direction is performed. Specifically, the roll-rotation platform 12 is rotated to make the longitudinal direction of the line light source 13 horizontal. Thereafter, while the line light source 13 is emitting lights, the vertical moving platform 11 is translated in the vertical direction. Thus, the line light source 13 intersects the vision fields of all the photographing pixels of the camera 7. The information denoting a correspondence relationship between output signals of each pixel and the position of the line light source 13 in the vertical direction, associated with time, is stored in a memory (not shown). When the vertical moving platform 11 is moved in the vertical direction, the distance between the vertical plane served as the reference position and the line light source 13 is maintained at the first distance.

At STEP 5, the Y axial rail 9 is moved away from the camera 7 to an appropriate position.

Thereafter, at STEP 6 and STEP 7, the same operation as that performed at STEP 3 and STEP 4, respectively, is repeated except that at STEP 6, the distance between the vertical plane served as the reference position and the line light source 13 is maintained at a predefined second distance different from the first distance when the Z axial rail 10 is moved in the lateral direction, and at STEP 7 of moving the line light source, the distance between the vertical plane served as the reference position and the line light source 13 is maintained at the predefined second distance when the vertical moving platform 11 is moved in the vertical direction.

At STEP 8, the position of the line light source 13 when the pixels are intersected by the line light source image is deduced for each individual pixel at STEP 3, STEP 4, STEP 6 and STEP 7. Specifically, on the basis of the information denoting the correspondence relationship between output signals from each pixel which is stored in the memory and the position of the line light source 13, a deduced line light source line L for deducing the position of the line light source 13 where the pixels are intersected by the line light source image is determined. For example, a time when the line light source image intersects a pixel is extracted as the time where the acceptance intensity of the pixel is the maximum, and the deduced line light source line L for deducing the position of the line light source 13 at that time is determined. For all the pixels, the lines for deducing the position of the line light source 13 when the line light source image intersects are determined as the deduced line light source lines L1, L2, L3 and L4 at STEP 3, STEP 4, STEP 6 and STEP 7, respectively.

At STEP 9, the initial value for the trajectory S of the incident ray is calculated for each pixel. Specifically, a straight line joining the mid-point between the closest points of the deduced line light source lines L1 and L2 determined at STEP 8 and the mid-point between the closest points of the deduced line light source lines L3 and L4 is used as the initial value for the trajectory S of the incident ray.

Thereafter, at STEP 10, optimization of the trajectory S of the incident ray is performed for each pixel. Specifically, on the basis of the initial value for the trajectory S of the incident ray obtained at STEP 9, the trajectory S of the incident ray is searched while subtly moving the trajectory S. A straight line with the minimum distance to the four deduced line light source lines L1, L2, L3 and L4 is deduced as the trajectory S of the incident ray. The approach for searching the trajectory S of the incident ray may be any known approach. In addition, if the deduced line light source lines are four and the intersection point thereof is used as the initial value, the STEP 10 is unnecessary. However, if the position of the line light source 13 is not set with respect to the camera 7 at the two distances, that is, a short distance and a long distance, but at other additional distances, or the deduced line light source lines are five or more, the trajectory S of the incident ray will not pass through all the intersection points due to errors, thereby, the processing at STEP 10 is obligatory.

Finally, at STEP 11, on the basis of the trajectory S of the incident ray deduced at STEP 10, the internal parameters of the camera 7 are set.

As mentioned in the above, according to the camera calibration method using the camera calibration device 1, the trajectory S of the incident ray can be deduced for all the pixels of the camera 7 by scanning the line light source 13 for four times. Thereby, in comparison with the camera 7 calibration method disclosed in Patent Document 1 for deducing the trajectory of the incident ray for each individual pixel, the calibration time of the camera is extremely shortened. Moreover, by mounting plural number of cameras 7 on the camera calibration device 1, it is possible to calibrate plural numbers of cameras 7 simultaneously. It is also possible to calibrate plural numbers of color components of the pixel of the camera 7 simultaneously. Thereby, the calibration time of the camera 7 can be further shortened.

Since four lines L1, L2, L3 and L4 passed by the trajectory S of the incident ray are specified for each individual pixel of the camera 7, similar to the camera calibration method disclosed in Patent Document 1, the camera calibration method of the present invention can perform camera calibration with extremely high accuracy. In practical, the camera calibration method disclosed in Patent Document 1 performs calibration with an interval of pixels, the accuracy thereof is worse than the method of the present invention.

Moreover, according to the camera calibration method disclosed in Patent Document 1, the trajectory of the incident ray is deduced for each pixel by the usage of a convergence processing based on feedback loop. Therefore, if the pixel corresponding to one incident ray is of plural numbers, they may not converge, making the calibration impossible. However, in the method of the present invention, the deduced line light source lines L1, L2, L3 and L4 are determined by deducing the position of the line light source 13 where the acceptance intensity of light for each pixel is the maximum, and the trajectory S of the incident ray is deduced as a straight line with the minimum distance to the deduced line light source lines L1, L2, L3 and L4. Therefore, the camera calibration method of the present invention has general versatility to cope with a common optical system including the case where plural pixels corresponding to one incident ray are present.

According to the camera calibration method disclosed in Patent Document 1, when the pan-tilt stage is rotated so as to make the point light source image move to the center of a pixel, a camera model is necessary to be prepared preliminarily. However, in the method of the present invention, regardless of the lens or the like mounted, the calibration can be performed for any camera in the same way by scanning the line light source 13 for four times; thereby, the camera model is not necessary.

Hereinafter, a camera calibration method by the usage of the camera calibration device 1 according to another embodiment of the present invention will be described with reference to FIG. 2 and FIG. 3. The camera calibration method of the present embodiment is similar to the one mentioned in the above, the difference therebetween only will be explained.

Firstly, the initial setting of the camera calibration device 1 is performed at STEP 1, and at STEP 2, the Y axial rail 9 is moved to an appropriate position close to the camera 7.

At STEP 3, the scanning of the line light source 13 in the lateral direction is performed. Specifically, the roll-rotation platform 12 of the three dimensional moving stage 4 is rotated to make the longitudinal direction of the line light source 13 vertical. Thereafter, while the line light source 13 is emitting lights, the pan-rotation platform 5 is rotated in the lateral direction. Thus, the line light source 13 intersects the vision fields of all the photographing pixels of the camera 7. The information denoting a correspondence relationship between output signals of each pixel and the position of the line light source 13 in the lateral direction, associated with time, is stored in a memory (not shown). When the pan-rotation platform 5 is rotated in the lateral direction, the distance between the central rotation shaft of the pan-rotation platform 5 served as the reference position and the line light source 13 is maintained at the predefined first distance.

Subsequently, at STEP 4, the scanning of the line light source 13 in the vertical direction is performed. Specifically, the roll-rotation platform 12 is rotated to make the longitudinal direction of the line light source 13 horizontal. Thereafter, while the line light source 13 is emitting lights, the tilt-rotation platform 6 is rotated in the vertical direction. Thus, the line light source 13 intersects the vision fields of all the photographing pixels of the camera 7. The information denoting a correspondence relationship between output signals of each pixel and the position of the line light source 13 in the vertical direction, associated with time, is stored in a memory (not shown).

At STEP 5, the Y axial rail 9 is moved away from the camera 7 to an appropriate position.

Thereafter, at STEP 6 and STEP 7, the same operation as that performed at STEP 3 and STEP 4, respectively, is repeated.

Then, at STEP 8, the position of the line light source 13 in STEP 3, 4, 6, 7, respectively, is determined for each pixel. When the pan-rotation platform 5 is rotated at angle θpan and the tilt-rotation platform 6 is rotated at angle θtilt, the position of point R (Rx, Ry, Rz) on the line light source 13 is moved to point R1 (Rx1, Ry1, Rz1), the relationship therebetween is denoted by the following expression.

$$\begin{pmatrix} Rx1 \\ Ry1 \\ Rz1 \end{pmatrix} = \begin{pmatrix} \cos\theta_{tilt}\cos\theta_{pan} & -\cos\theta_{tilt}\sin\theta_{pan} & \sin\theta_{tilt} \\ \sin\theta_{pan} & \cos\theta_{pan} & 0 \\ -\sin\theta_{tilt}\cos\theta_{pan} & \sin\theta_{tilt}\sin\theta_{pan} & \cos\theta_{tilt} \end{pmatrix} \begin{pmatrix} Rx \\ Ry \\ Rz \end{pmatrix}$$ [Expression 1]

At STEP 9, the initial value for the trajectory S of the incident ray is calculated for each pixel. Thereafter, at STEP 10, optimization of the trajectory S of the incident ray is performed for each pixel. Finally, at STEP 11, the internal parameters of the camera 7 are set on the basis of the trajectory S of the incident ray deduced at STEP 10.

The camera calibration method of the present embodiment can achieve the same effects as that described in the above embodiment.

Furthermore, it is not necessary to move the Z axial rail 10 and the vertical moving platform 11 in the present method; therefore, it is possible to miniaturize the camera calibration device 1.

Hereinafter, the correspondence relationship between the present invention and the abovementioned embodiment will be supplementally explained.

In the present embodiment, the pan-rotation platform 5, the tilt-rotation platform 6, the Z axial rail 10 and the vertical moving platform 11 are equivalent to the moving member of the present invention; the Y axial rail 9 is equivalent to the distance varying member of the present invention; and the roll-rotation platform 12 is equivalent to the rotation member of the present invention.

In FIG. 3, the processing of STEP 3 is equivalent to the first line light source moving step of the present invention; the processing of STEP 4 is equivalent to the second line light source moving step of the present invention; the processing of STEP 6 is equivalent to the third line light source moving step of the present invention; the processing of STEP 7 is equivalent to the fourth line light source moving step of the present invention; and the processing from STEP 8 to STEP 10 is equivalent to the trajectory deducing step of the present invention.

The camera calibration method of the present invention is not obligatory to have the camera calibration device 1 used therein; it is acceptable for it to be performed without the camera calibration device 1.

When the camera calibration method of the present invention is performed according to an embodiment, for example, it is acceptable that the pan-rotation platform and the tilt-rotation platform 6 are fixed in the camera calibration device 1 in such a way that both are unable to rotate. When the camera calibration method of the present invention is performed according to another embodiment, it is acceptable that the Z axial rail 10 and the vertical moving platform 11 are fixed in the camera calibration device 1 in such a way that both are unable to move.

It is acceptable to fix a line light source with the longitudinal direction thereof in the vertical direction and another line light source with the longitudinal direction thereof in the lateral direction directly on the vertical moving platform 11. According thereto, the roll-rotation platform 12 is unnecessary. At STEP 3 and STEP 6, the line light source with the longitudinal direction thereof in the vertical direction is lightened, and at STEP 4 and STEP 7 only, the line light source with the longitudinal direction thereof in the lateral direction is lightened. It is also acceptable to dispose the line light sources at different distances, respectively, from the reference plane, consequently from the camera 7. According thereto, there is no need to move the Y axial rail 9 at STEP 5.

The trajectory S of the incident ray is determined as a straight line with the minimum distance to four deduced line light source lines; however, it is not limited thereto, the trajectory S of the incident may also be determined as a straight line with the minimum distance to five deduced line light source lines. According thereto, the position of the trajectory S of the incident ray can be determined at higher accuracy, enabling the calibration to be performed at further high accuracy.

If the expansion of the base point P0 of the incident ray is considered to be sufficiently small and already known, the trajectory S of the incident ray can be deduced as a straight line passing through at least two deduced line light source lines which pass through the base point P0. According thereto, the times of scanning can be decreased, and the calibration time can be shortened.

At STEP 3, 4, 6, 7, the scan is performed by making the line light source 13 intersect the vision fields of all pixels of the camera 7 for one time; however, it is not limited thereto. For example, if the length of the line light source 13 is short, the scan may be performed by making the line light source 13 intersect the vision fields of all pixels of the camera 7 for several times. In this case, it is preferred to overlap the scanning range. It should be noted that the scanning time is shortened if the entire vision fields can be covered by performing the scanning for one time.

At STEP 3, 4, 6, 7, the scanning is performed in a direction orthogonal to the longitudinal direction of the line light source 13; however, it is not limited thereto, it is acceptable to perform the scanning at a direction different from the longitudinal direction of the line light source 13. However, since the pixels of the camera 7 are generally disposed in a rectangular shape, if the scanning is performed in a direction orthogonal to the longitudinal direction of the line light source 13, the length of the line light source 13 can be shortened, or the entire vision fields can be covered performing the scanning for one time.

The line light source 13 is described to have a shape of a straight line; however, there is no limit to the shape thereof even if it is of a linear shape. However, by using the line light source 13 having the shape of a straight line, the calculations would be easier when determining the intersection points of the deduced line light source lines and deducing a straight line with the minimum distance to the four deduced line light source lines as the trajectory of the incident ray. On the other hand, by using the line light source 13 having the shape of an arc or circle, the times for scanning the entire pixels can be reduced when calibrating a camera having a lens of a wide vision field such a wide-angle lens or a fish-eye lens.

The line light source 13 is described to have the number of one; however, the line light source may be a set. By using a set of line light sources, the scanning distance or the scanning angle can be reduced, shortening the scanning time. However, when a set of line light sources 13 are used, it is necessary to specify the line light sources before performing the scanning. For example, a line light source can be specified by encoding it through blinking the line light source. The other line light source remained can be specified sequentially with the specified line light source as a reference. In addition, every single line light source can be specified individually by encoding the single line light source through blinking it.

What is claimed is:

1. A camera calibration method configured to determine internal parameters of a camera through deducing a trajectory of an incident ray to each pixel, comprising:
    a first line light source moving step of moving a line light source with respect to a reference position in a direction different from a longitudinal direction of the line light source, and storing a position of the line light source for each individual pixel where the incident ray from the line light source is photographed by each pixel;
    a second line light source moving step of moving the line light source with respect to the reference position in a direction different from both the longitudinal direction of the line light source and the direction of the first line light moving step, and storing a position of the line light source for each pixel where the incident ray from the line light source is photographed by each pixel;
    a third line light source moving step of moving the line light source with respect to the reference position in a direction different from the longitudinal direction of the line light source and with a distance to the reference position different from that in the first and second line light source moving steps, and storing a position of the line light source for each individual pixel where the incident ray from the line light source is photographed by each pixel; and
    a fourth line light source moving step of moving the line light source with respect to the reference position in a direction different from both the longitudinal direction of the line light source and the direction of the third line light moving step and with a distance to the reference position different from that in the first and second line light source moving steps, and storing a position of the line light source for each individual pixel where the incident ray from the line light source is photographed by each pixel; and
    a trajectory deducing step of deducing a straight line with a minimum distance to the positions of the line light source stored in the first line light source moving step to the fourth light source moving step for each individual pixel, respectively, as the trajectory of the incident ray to each pixel.

2. The camera calibration method according to claim 1, wherein the position of the line light source where the light acceptance intensity of the pixel is the maximum is stored as the position of the line light source where the incident ray from the line light source is photographed by each pixel in the line light source moving steps from the first line light source moving step to the fourth light source moving step.

3. The camera calibration method according to claim 1, wherein
    the line light source is moved with respect to the reference position with the distance between the reference position and the line light source maintained at a first distance in the first and the second light source moving steps; and
    the line light source is moved with respect to the reference position with the distance between the reference position and the line light source maintained at a second distance different from the first distance in the third and the fourth light source moving steps.

4. The camera calibration method according to claim 3, wherein a straight line passing through the intersection point of two line light sources stored in the first and the second line light source moving steps for each individual pixel and the intersection point of two line light sources stored in the third and the fourth line light source moving steps for each pixel is deduced as the trajectory of the incident ray to each pixel in the trajectory deducing step when the reference position is a plane.

5. The camera calibration method according to claim 3, wherein a straight line passing through the mid-point between the closest point to position of the line light source stored in the first line light source moving step and the closest point to position of the line light source stored in the second line light source moving step and the mid-point between the closest point to position of the line light source stored in the third line light source moving step and the closest point to position of the line light source stored in the fourth line light source moving step is taken as an initial value in the trajectory deducing step, and the trajectory of the incident ray is searched in such a way that the sum of squares of the distances to the four positions of the line light source is minimum.

6. The camera calibration method according to claim 4, wherein a straight line passing through the mid-point between the closest point to position of the line light source stored in the first line light source moving step and the closest point to position of the line light source stored in the second line light source moving step and the mid-point between the closest point to position of the line light source stored in the third line light source moving step and the closest point to position of the line light source stored in the fourth line light source moving step is taken as an initial value in the trajectory deducing step, and the trajectory of the incident ray is searched in such a way that the sum of squares of the distances to the four positions of the line light source is minimum.

7. A camera calibration device configured to determine internal parameters of a camera through deducing a trajectory of an incident ray to each pixel, comprising:
- a moving member capable of moving a line light source with respect to a reference position with the distance between the line light source and the reference position maintained constant;
- a rotation member capable of rotating the line light source with respect to the reference position with the distance between the line light source and the reference position maintained constant;
- a distance varying member capable of varying the distance between the line light source and the reference position; and
- a control unit programmed to perform:
- a first line light source moving step of using the moving member and the rotation member move the line light source with respect to the reference position in a direction different from a longitudinal direction of the line light source, and storing on a memory of the control unit a position of the line light source for each individual pixel where the incident ray from the line light source is photographed by each pixel;
- a second line light source moving step of making the moving member and the rotation member move the line light source with respect to the reference position in a direction different from both the longitudinal direction of the line light source and the direction of the first line light moving step, and storing on a memory of the control unit a position of the line light source for each pixel where the incident ray from the line light source is photographed by each pixel;
- a third line light source moving step of making the moving member and the rotation member move the line light source with respect to the reference position in a direction different from the longitudinal direction of the line light source and with a distance to the reference position different from that in the first and second line light source moving steps, and storing on a memory of the control unit a position of the line light source for each individual pixel where the incident ray from the line light source is photographed by each pixel; and
- a fourth line light source moving step of making the moving member and the rotation member move the line light source with respect to the reference position in a direction different from both the longitudinal direction of the line light source and the direction of the third line light moving step and with a distance to the reference position different from that in the first and second line light source moving steps, and storing on a memory of the control unit a position of the line light source for each individual pixel where the incident ray from the line light source is photographed by each pixel; and
- a trajectory deducing step of deducing a straight line with a minimum distance to the positions of the line light source stored in the first line light source moving step to the fourth light source moving step for each individual pixel, respectively, as the trajectory of the incident ray to each pixel.

8. The camera calibration device according to claim 7, wherein the rotation member is capable of rotating the line light source 90 degrees with respect to the reference position.

9. The camera calibration device according to claim 7, wherein the line light source is composed of a plurality of line light sources disposed parallel to each other in the longitudinal direction.

10. The camera calibration device according to claim 8, wherein the line light source is composed of a plurality of line light sources disposed parallel to each other in the longitudinal direction.

* * * * *